US009904021B2

(12) United States Patent
Wu et al.

(10) Patent No.: US 9,904,021 B2
(45) Date of Patent: Feb. 27, 2018

(54) OPTICAL FIBER CONNECTOR

(71) Applicant: ADVANCED-CONNECTEK INC., New Taipei (TW)

(72) Inventors: Jun Wu, New Taipei (TW); Yang-Yang Cui, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 0 days.

(21) Appl. No.: 15/655,319

(22) Filed: Jul. 20, 2017

(65) Prior Publication Data
US 2018/0024300 A1    Jan. 25, 2018

(30) Foreign Application Priority Data
Jul. 20, 2016  (CN) ..................... 2016 2 0765298 U

(51) Int. Cl.
G02B 6/26 (2006.01)
G02B 6/38 (2006.01)
G02B 6/36 (2006.01)

(52) U.S. Cl.
CPC ........... *G02B 6/387* (2013.01); *G02B 6/3636* (2013.01); *G02B 6/3644* (2013.01); *G02B 6/3825* (2013.01); *G02B 6/3858* (2013.01)

(58) Field of Classification Search
CPC .. G02B 6/12007; G02B 6/4214; G02B 6/125; G02B 6/43; G02B 6/26
See application file for complete search history.

(56) References Cited

U.S. PATENT DOCUMENTS 7,070,450 B2 *   7/2006   Lin ..................... H01R 13/5213
                                                         439/607.02
9,553,402 B2 *   1/2017   Thelen ................. H01R 13/502

* cited by examiner

*Primary Examiner* — Jennifer Doan
(74) *Attorney, Agent, or Firm* — Muncy, Geissler, Olds & Lowe, P.C.

(57) ABSTRACT

An optical fiber connector includes an inner shell, an outer shell, and a handle. The outer shell is fitted over the inner shell. Two clamping arms are respectively extending from two ends of a side portion of the handle. Accordingly, since the handle and the outer shell are in a point-contact configuration, when a user pulls the handle, the handle drives the outer shell to move backwardly via the configuration and further compress the spring in the inner shell. Therefore, the connector can be detached from the fiber adapter. Conversely, when the user pushes the handle, the push block on the handle pushes the tail cap due to the mating between the push block and the tail cap, so that the optical fiber connector can be inserted into the fiber adapter.

11 Claims, 9 Drawing Sheets

OPTICAL FIBER CONNECTOR

CROSS-REFERENCE TO RELATED APPLICATION

This non-provisional application claims priority under 35 U.S.C. § 119(a) to Patent Application No. 201620765298.X filed in China, P.R.C. on Jul. 20, 2016, the entire contents of which are hereby incorporated by reference.

FIELD OF THE INVENTION

The instant disclosure relates to a connector, and more particular to an optical fiber connector.

BACKGROUND

In the optical fiber fields, signals are in pairs and matched with each other, one for transmitting, and one for receiving. Optical transmission tools for optical fibers may be used to connect several short optical fibers with each other to form a long optical fiber. The optical transmission tools may be also used for connecting the optical fiber to an active component, e.g., a light source or a detector or to a passive component, e.g., a light switch or an attenuator. The primary function of an optical fiber connector is to align the core of the optical fiber with the optical path of the connecting component. Hence, the light beam in the optical fiber can be coupled to the optical path of the connecting component.

There are many types of optical fiber connectors. Specifically, MPO (multi-fibre push on) connector is a multi-core and multi-channel connector, and the connector is suitable for configuring high-density optical fibers in a limited space. In general, a conventional optical fiber connector includes a housing having a ferrule for positioning one or more optical fibers. The ferrule is extending out of the housing. Therefore, when the connector is mated with another component, the optical fiber in the ferrule can be coupled to the optical path of the connecting component.

A front portion of a conventional MPO type male optical fiber connector for multiple optical fibers has a guiding pin, and a front portion of a conventional MPO type female optical fiber connector has a corresponding guiding hole. When the two optical fiber connectors are respectively located at two opposite openings of a fiber adapter, hooks of the fiber adapter are respectively engaged with two recessed portions of the two optical fiber connectors, and the guiding pin is inserted into the guiding hole. However, when the connectors are used in a crowded and dense environment like a cabinet or rack in which several connectors are mated with the panel of the apparatus in a dense and crowded manner, it is not easy for the user to pull out the connector from the apparatus.

As a result, a conventional optical fiber connector is provided with a handle, and the user can pull the connector out of the apparatus by pulling the handle. Nevertheless, the handle for the conventional optical fiber connector is just for pulling the connector out of the apparatus, the handle cannot provide a push force for the mating between the optical fiber connector and the fiber adapter.

SUMMARY OF THE INVENTION

To solve the problems, according some embodiments of the optical fiber connector of the instant disclosure, since the handle and the outer shell are in a point-contact configuration, when a user pulls the handle, the handle drives the outer shell to move backwardly and further compress the spring in the inner shell. Therefore, the connector can be detached from the fiber adapter. Conversely, when the user pushes the handle, the push block on the handle pushes the tail cap due to the mating between the push block and the tail cap, so that the optical fiber connector can be inserted into the fiber adapter. Furthermore, the length of the handle can be adjusted to be longer or shorter by connecting to an elastic arm.

In view of these, an embodiment of the instant disclosure provides an optical fiber connector comprising at least one inner shell, an outer shell, and a handle. One of two ends of the at least one inner shell has a connection head and the other end of the at least one inner shell extends a tail cap. The tail cap has an abutting surface at an end portion of the tail cap, and an outer diameter of of the end portion of the tail cap is gradually reduced toward a free end of the tail cap. The outer shell is fitted over the at least one inner shell. The outer shell is formed by two side surfaces and two wall surfaces. The two side surfaces are substantially perpendicular to the two wall surfaces, and the outer shell comprises a plurality of buckling members assembled on the two side surfaces. Two clamping arms are respectively extending from two ends of a side portion of the handle. Each of the clamping aims is substantially perpendicular to the handle. Each of the clamping aims comprises a plurality of buckling portions for buckling with the corresponding buckling member. The handle further comprises a push block fitting over the tail cap. An inner wall of the push block comprises a mating surface for contacting the abutting surface.

In one embodiment, the handle comprises a slot formed on a bottom portion of the push block.

In one embodiment, the abutting surface and the mating surface are cone shaped.

In one embodiment, the end portion of the tail cap comprises a plurality of skidproof grooves formed on the abutting surface.

In one embodiment, each of the buckling members is a guiding groove and each of the buckling portions is an engaging block.

In one embodiment, a longer guiding groove and a shorter guiding groove are respectively formed on each of the side surfaces, and the shorter guiding groove is near one of two sides of the side surfaces.

In one embodiment, a longer engaging block and a shorter engaging block are respectively formed on an inner wall of each of the clamping arms, and the shorter engaging block is near one of two sides of the inner wall of each of the clamping arms.

In one embodiment, a mating frame is formed on one side of the outer shell, two curved surfaces are respectively formed on two sides of the mating frame and protruding outwardly.

In one embodiment, a clamping piece is extending from an end portion of each of the clamping anus, each of the clamping anus and the corresponding clamping piece form an L shaped structure, an opening is formed between the two clamping pieces, each of the clamping pieces is attached on one of the two wall surfaces.

In one embodiment, two guide pins are protruding from a front portion of the connection head, and a transmission cable is extending from the end portion of the tail cap.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

Figure 1:
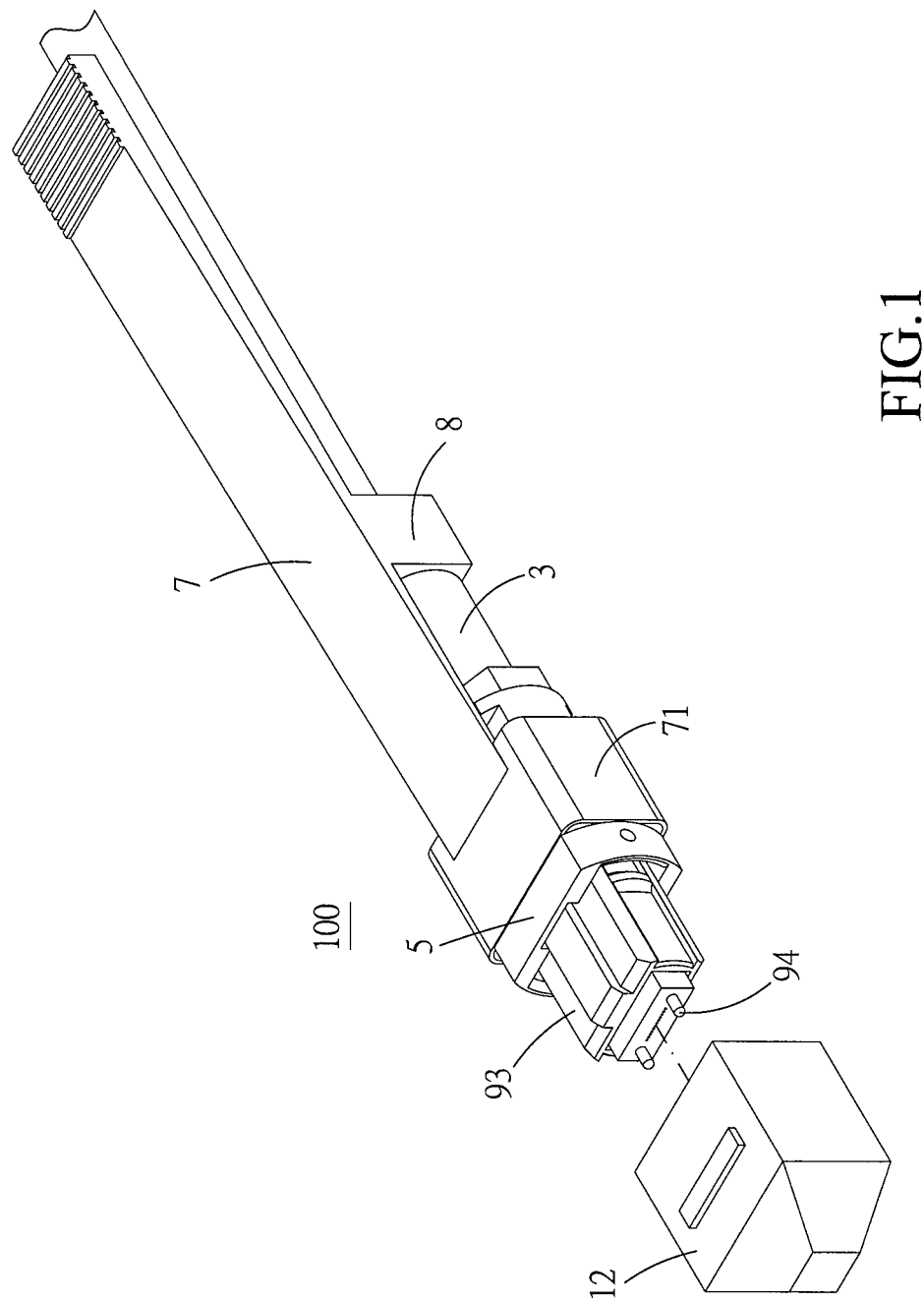
FIG. 1 illustrates a perspective view of an optical fiber connector according to a first embodiment of the instant disclosure.
Figure 2:
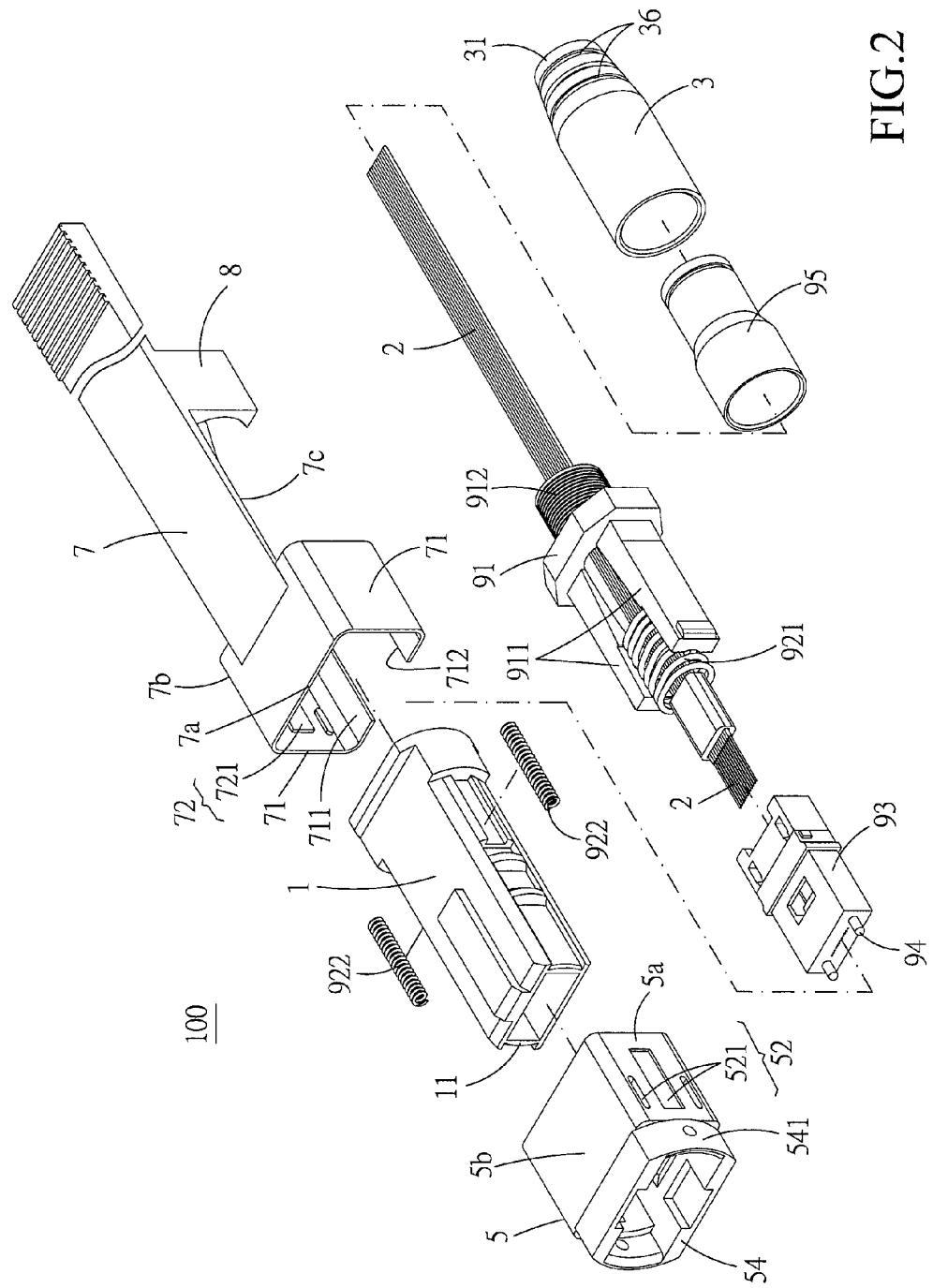
FIG. 2 illustrates an exploded view of the optical fiber connector of the first embodiment.

Please refer to FIGS. 1 and 2, illustrating an optical fiber connector of a first embodiment according to the instant disclosure. FIG. 1 illustrates a perspective view of an optical fiber connector according to a first embodiment of the instant disclosure. FIG. 2 illustrates an exploded view of the optical fiber connector of the first embodiment. In this embodiment, the optical fiber connector 100 is an MPO (multi-fibre push on) type optical fiber connector. The optical fiber connector 100 comprises at least one inner shell 1, an outer shell 5, and a handle 7. In this embodiment, the inner shell 1 and the outer shell 5 are assembled with other components to form the connector, the connector comprises at least one inner shell 1, and one connector is provided with one pulling bar 7, but embodiments are not limited thereto. In some embodiments, two or more connectors in a set may be assembled with the handle 7. In this embodiment, the optical fiber connector 7 comprises a lid for covering a connection head 11 of the front end of the inner shell 1.

Figure 3:
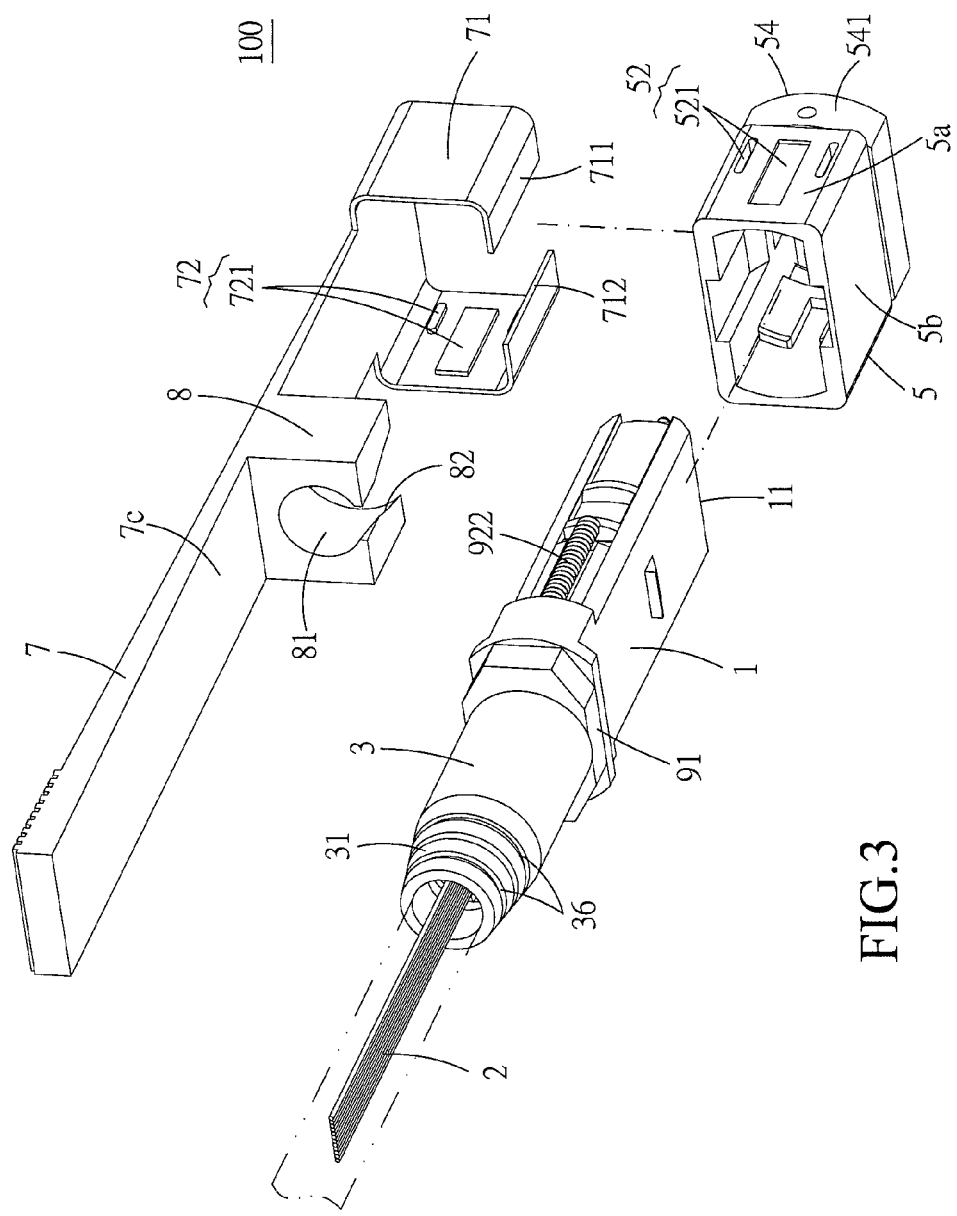
FIG. 3 illustrates another exploded view of the optical fiber connector of the first embodiment.

Please refer to FIGS. 2 and 3. FIG. 3 illustrates another exploded view of the optical fiber connector of the first embodiment. In this embodiment, the inner shell 1 is a cuboidal frame, and one of two ends of the inner shell 1 has a connection head 11 for inserting into a housing of a fiber adapter. Furthermore, the other end of the inner shell 1 extends a tail cap 3. The tail cap 3 is a cylinder tube. The tail cap 3 has an abutting surface 31 at an end portion of the tail cap 3, and an outer diameter of the end portion of the tail cap 2 is gradually reduced toward a free end of the tail cap 3. The abutting surface 31 is an inclined surface. Two guide pins are protruding from a front portion of the connection head 11. A transmission cable is extending from the end portion of the tail cap 3, and the transmission cable receives a plurality of optical fibers 2. In one embodiment, the abutting surface 31 is cone shaped, so that the outer diameter of the end portion of the tail cap 3 is gradually reduced. Furthermore, the end portion of the tail cap 3 comprises a plurality of skidproof grooves 36 formed on the abutting surface 31. Each of the skidproof grooves 36 is an annular groove formed on the abutting surface 31.

Please refer to FIGS. 2 and 3. In this embodiment, the outer shell 5 has a coupling function and is used for connecting to the housing of the fiber adapter. In this embodiment, the outer shell 5 is a hollowed frame in cuboidal shape, and the outer shell 5 is fitted over the inner shell 1. In this embodiment, the length of the outer shell 5 is shorter than the length of the inner shell 1, and the outer shell 5 is fitted over a rear portion of the inner shell 1. Furthermore, the outer shell 5 is driven by the handle 7 to move relative to the inner shell 1.

Please refer to FIGS. 2 and 3. In this embodiment, the outer shell 5 is formed by two side surfaces 5a and two walls surfaces 5b (i.e., a top surface and a bottom surface). The two side surfaces 5a are substantially perpendicular to the two wall surfaces 5b. Moreover, the two side surfaces 5a of the outer shell 5 are flat and parallel with each other, being different from the outer shell 5 of a conventional connector having two concaved side surfaces.

Please refer to FIGS. 2 and 3. In this embodiment, the outer shell 5 comprises a plurality of buckling members 52 assembled on the two side surfaces 5a. In this embodiment, each of the buckling members 52 is a guiding groove 521. The guiding groove 521 is a recess formed on the side surface 5a. Further, a longer guiding groove 521 and two shorter guiding grooves 521 are respectively formed on each of the side surfaces 5a, and the shorter guiding grooves 521 are near two sides of each of the side surfaces 5a, respectively. Accordingly, the guiding grooves 521 are engaged with the engaging blocks 721 of the handle 7, so that the fixation between the outer shell 5 and the handle 7 can be improved. Therefore, the outer shell 5 can be smoothly moved along with the handle 7 when the handle 7 is pulled.

In the foregoing embodiment, the buckling member 52 is a guiding groove 521, but embodiments are note limited thereto. In one embodiment, each of the buckling members 52 may be a protruding block, and each of the buckling portions 72 of the handle 7 may be a recess for engaging with the protruding block.

Figure 4:
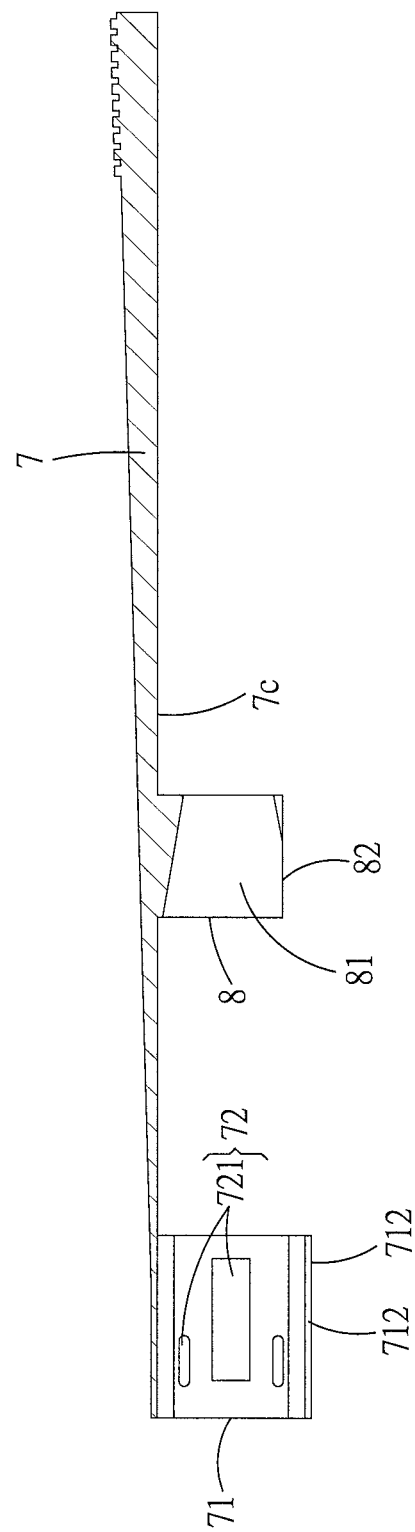
FIG. 4 illustrates a lateral sectional view of a handle of the optical fiber connector of the first embodiment.

Please refer to FIGS. 2 to 4. FIG. 4 illustrates a lateral sectional view of a handle of the optical fiber connector of the first embodiment. In this embodiment, the handle 7 is an elongated flat plate. Two clamping arms 71 are respectively and downwardly extending from two ends 7b of a side portion 7a of the handle 7 in a same direction. In other words, the portion of the handle 7 having the clamping arms 71 is of a reversed U shape. In addition, each of the clamping arms 71 is substantially perpendicular to the handle 7, and the side portion 7a of the handle 7 and the two clamping aims 71 are respectively attached on the top wall surface 5b and the two side surfaces 5a of the outer shell 5.

Figure 5:
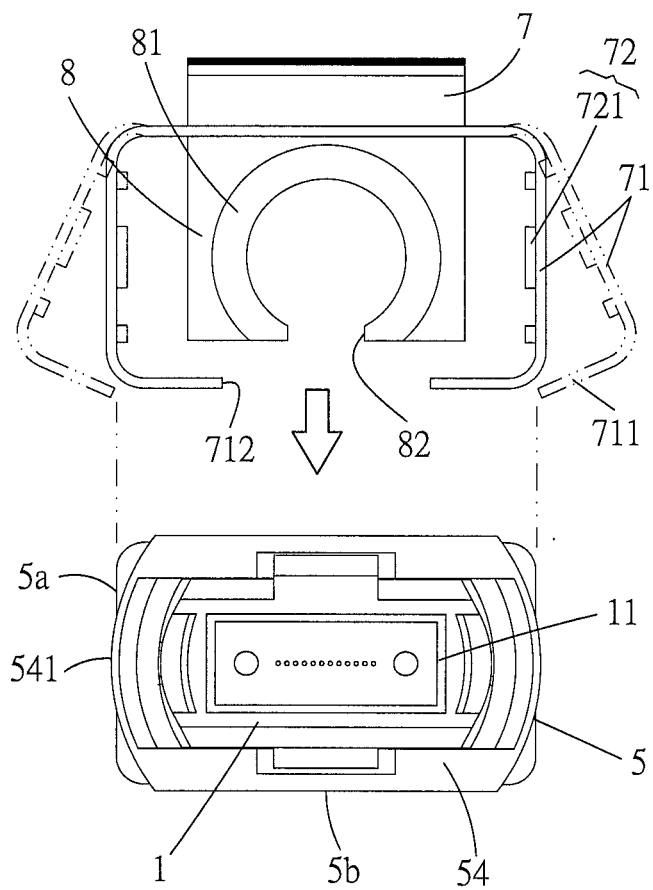
FIG. 5 illustrates a front view of the optical fiber connector of the first embodiment where the handle is unassembled.
Figure 6:
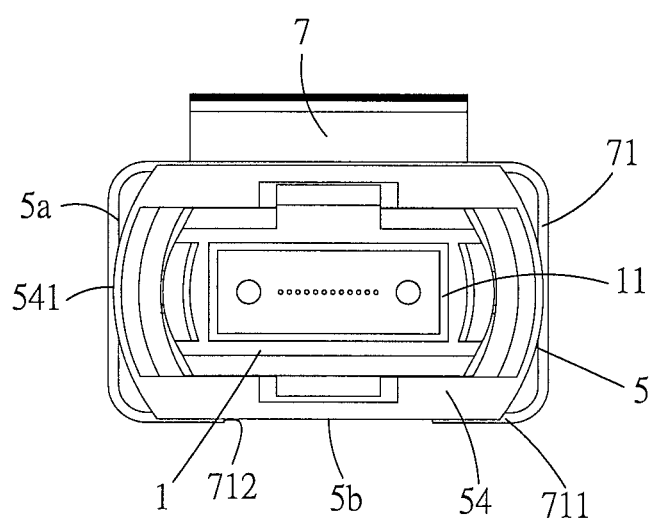
FIG. 6 illustrates a front view of the optical fiber connector of the first embodiment where the handle is assembled.

Please refer to FIGS. 5 and 6. FIG. 5 illustrates a front unassembled view of the optical fiber connector of the first embodiment. FIG. 6 illustrates a front assembled view of the optical fiber connector of the first embodiment. Because of the flat design of the clamping arms 71, when the handle 7 is assembled to the outer shell 5, the two clamping arms 71 are forced to move away from each other until the distance between the two clamping pieces 711 is large enough to allow the clamping pieces 711 to buckle on the outer shell 5. In detail, the flat design of the side surfaces 5a allows the distance between the side surfaces 5a to be smaller than a conventional connector having concaved side surfaces. Hence, a user can expand the clamping arms 71 from each other and buckle the clamping aims 71 on the outer shell 5. It is understood that, in the case of having several optical fiber connectors 100 assembled in a cabinet, the handle 7 is assembled with the outer shell 5 for each connector from top to bottom, so that the user can assemble the handle 7 with the outer shell 5 in a convenient manner; conversely, in conventional, the handle is assembled with the outer shell from a side portion of the outer shell.

Furthermore, the other side (i.e., the portion of the handle 7 opposite to the side portion) can have lengthened or shortened lengths. The handle 7 may be connected to an additional elastic aim to have a longer length. Therefore, the handle 7 can be adapted to fit with different limitations of different facilities (racks or cabins).

Please refer to FIGS. 2 to 4. In this embodiment, the handle 7 comprises a plurality of buckling portions 72 respectively engaging with the buckling members 52. In this embodiment, each of the buckling portions 72 is an engaging block 721. The engaging block 721 is a protrusion formed on an inner wall of each of the clamping arms 71. Furthermore, a longer engaging block 721 and two shorter engaging blocks 721 are respectively formed on the inner wall of each of the clamping arms 71, and the shorter engaging blocks 721 are near two sides of the inner wall of each of the clamping arms 71, respectively. Accordingly, the guiding grooves 521 are engaged with the engaging blocks 721 of the handle 7, so that the fixation between the outer shell 5 and the handle 7 can be improved. Therefore, the outer shell 5 can be smoothly moved along with the handle 7 when the handle 7 is pulled.

Please refer to FIGS. 2 to 4. In this embodiment, a surface 7c of the handle 7 further comprises a push block 8 fitting over the tail cap 3. In this embodiment, an inner wall of the push block 8 comprises a mating surface 81 for contacting the abutting surface 31. In one embodiment, the push block 8 is a hollowed cube-like block, and the mating surface 81 is located on an inner periphery surface of a hole formed in the push block 8. Furthermore, the mating surface 81 is an inclined surface, and the whole mating surface 81 is cone shaped. The structure of the mating surface 81 corresponds to the structure of the end portion of the tail cap 3, and the sectional area of the tail cap 3 and the sectional area of the hole of the push block 8 are gradually reduced. Furthermore, a predetermined distance is between the push block 8 and the clamping anus 71, and the predetermined distance is determined according to the distance between the outer shell 5 and the tail cap 3.

Please refer to FIGS. 2 to 4. In this embodiment, the handle 7 comprises a slot 82 formed on a bottom portion of the push block 8. Hence, the user can assemble the handle 7 with the tail cap 3 via the slot of the push block 8. In some other embodiments, the push block 8 is devoid of the slot 82, and the push block 8 is directly fitting over the tail cap 3.

Please refer to FIGS. 2 to 4. In this embodiment, a clamping piece 711 is extending from an end portion of each of the two clamping anus 71. Each of the clamping anus 7 and the corresponding clamping piece 711 form an L shaped structure. An opening 712 is formed between the two clamping pieces 711, and the slot 82 and the opening 712 is underneath the handle 7. When the user tends to assemble the handle 7 with the outer shell 5 and the tail cap 3, the two clamping aims 71 are forced outwardly to move away from each other. Next, when the distance between the two clamping pieces 711 is greater than the width of the outer shell 5, the clamping arms 71 can be buckled on two sides of the outer shell 5, so that the buckling members 52 can be engaged and positioned with the buckling portions 72 and the clamping pieces 711 can be attached to the bottom wall surface 5b of the outer shell 5. Next, the push block 8 is connected to the end portion of the tail cap 3, so that the abutting surface 31 in cone shape is in contact with the mating surface 81 in cone shape.

Figure 7:
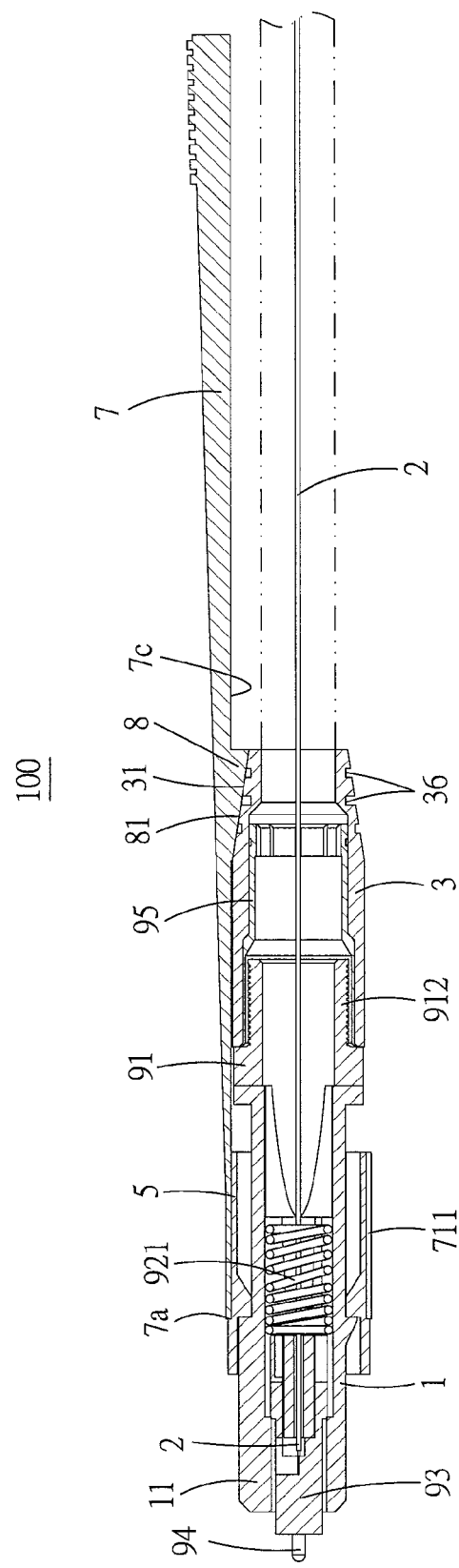
FIG. 7 illustrates a lateral sectional view of the optical fiber connector of the first embodiment.
Figure 8:
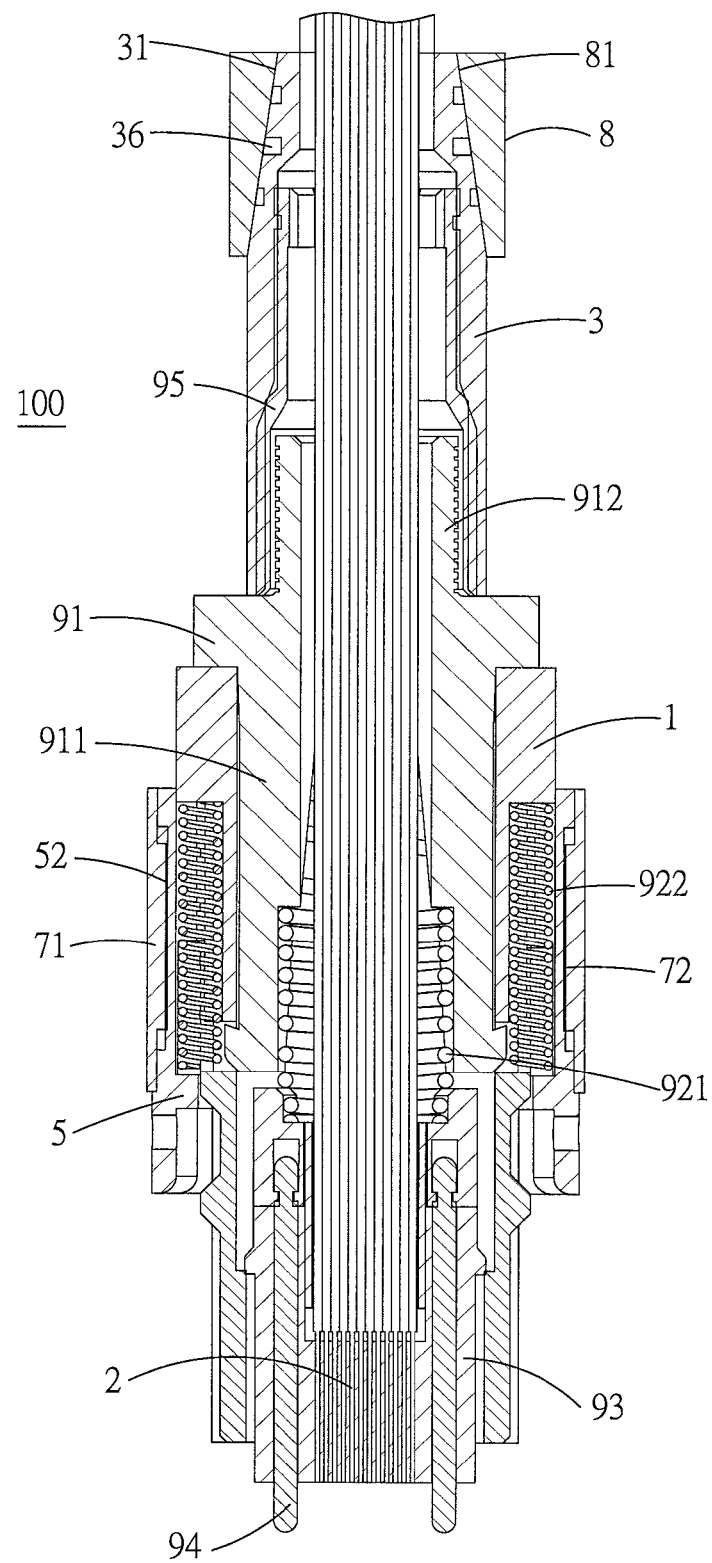
FIG. 8 illustrates a top sectional view of the optical fiber connector of the first embodiment.

Please refer to FIGS. 2, 3, 7, and 8. FIG. 7 illustrates a lateral sectional view of the optical fiber connector of the first embodiment. FIG. 8 illustrates a top sectional view of the optical fiber connector of the first embodiment. In this embodiment, when the optical fiber connector 100 inserted into the fiber adapter is to be detached from the fiber adapter, the handle 7 is pulled backwardly, so that the optical fiber connector 100 can be detached from the fiber adapter. In detail, because the buckling portions 72 of the handle 7 are engaged with the buckling members 52 of the outer shell 5, the pulling force applied to the handle 7 drives the outer shell 5 to move backwardly. Next, because the hooks of the fiber adapter is not baffled by the outer shell 5, the hooks of the fiber adapter can be detached from the buckles at two sides of the inner shell 1 when the inner shell 1 is pulled backwardly along with the outer shell 5. Accordingly, the optical fiber connector 100 can be detached from the fiber adapter.

Please refer to FIGS. 2, 3, and 7. In this embodiment, when the optical fiber connector 100 is to be inserted into the fiber adapter, the handle 7 is pushed forwardly to drive the optical fiber connector 100 to be inserted into the fiber adapter. Since the push block 8 of the handle 7 is combined with the tail cap 3, the pushing force applied to the handle 7 can be transmitted to the tail cap 3 and further transmitted to the whole connector. Therefore, the operation of inserting the optical fiber connector 100 to the fiber adapter is convenient. Furthermore, because the shape of the push block 8 and that of the tail cap 3 are mated with each other, the force applied to the push block 8 can be properly transmitted to the tail cap 3. Moreover, because the abutting surface 31 and the mating surface 81 are inclined surfaces and are in contact with each other, the pushing force applied to the push block 8 can be transmitted to the tail cap 3 properly, and the force is then transmitted to the connection head 11 to allow the connection head 11 to be inserted into the housing of the fiber adapter. In addition, typically, several connectors are used in a cabinet, and the distance between adjacent connectors is too small to allow the connector to be pulled by hands. Thus, the connector cannot be detached or replaced quickly. By the application of the handle 7, the connectors can be detached from the cabinet quickly when several connectors are inserted into a cabinet in a dense manner.

Please refer to FIGS. 2 and 3. In this embodiment, a mating frame 54 is formed on one side of the outer shell 5. Two curved surfaces 541 are respectively formed on two sides of the mating frame 54 and protruding outwardly. In this embodiment, the curved surfaces 541 are protruding and different from the side surfaces 5a with flat design. Therefore, the two curved surfaces 541 can be used for mating with a fiber adapter having a housing with curved surfaces.

Please refer to FIGS. 2 and 3. In this embodiment, a connecting block 91, a first spring 21, a plurality of second springs 922, a mating block 93, two pins 94, and a positioning tube 95 are in the inner shell 1. The connecting block 91 is hollowed. Two arms 911 are respectively extending from two sides of one of two opposite surfaces of the connecting block 91. A screw post 912 is protruding from the other surface of the connecting block 91, and the positioning tube 95 is threaded on the screw post 912. The positioning tube 95 is fitted over by the tail cap 3. The first spring 921 is received between the clamping arms 91 to provide an elastic force for the mating block 93. The second springs 922 are respectively located at two outer sides of the inner shell 1 to provide an elastic force for the outer shell 5. The mating block 93 is at the front portion of the inner shell 1, and the two pins 94 are protruding from two sides of the surface of the mating block 93.

Figure 9:
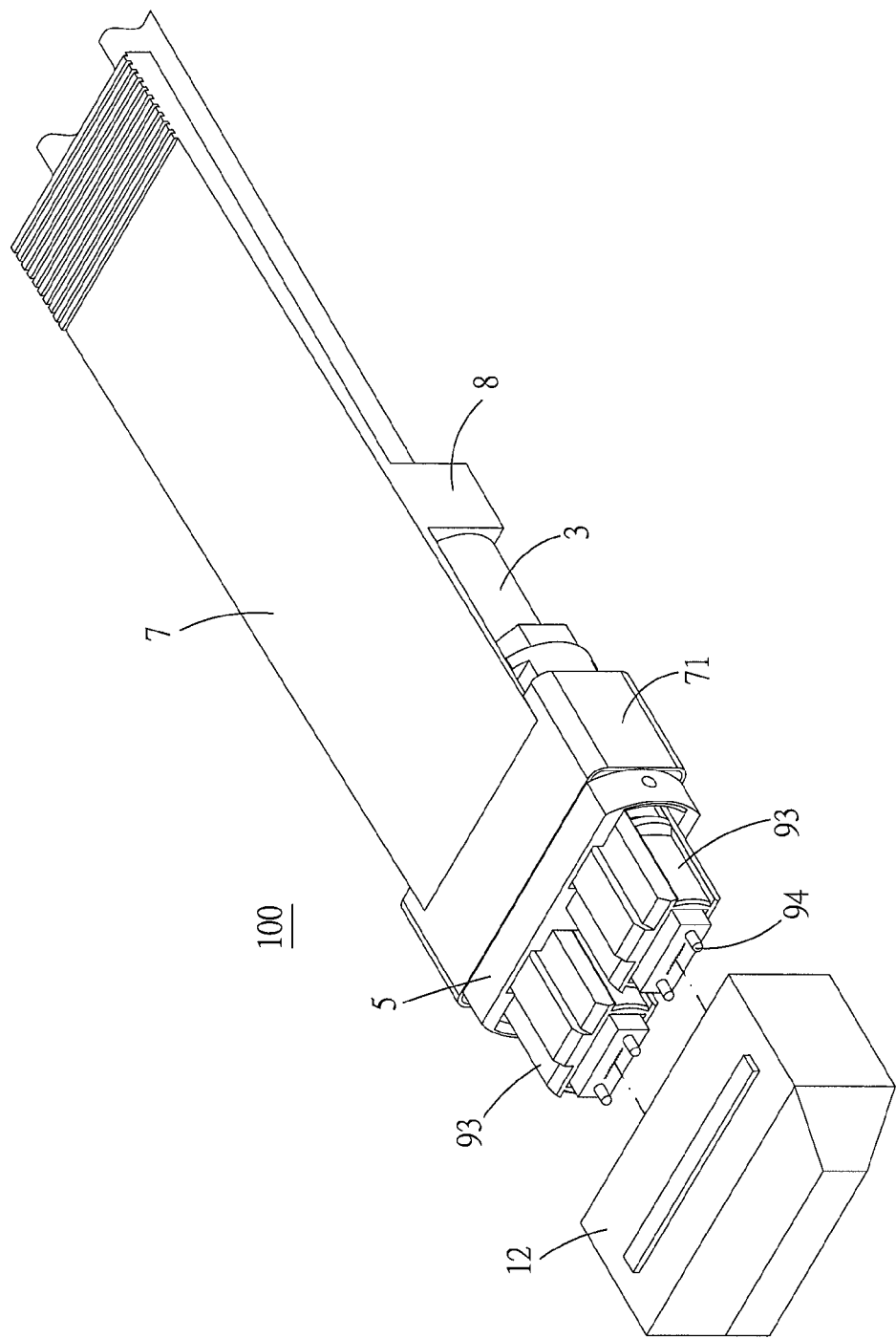
FIG. 9 illustrates a perspective view of an optical fiber connector according to a second embodiment of the instant disclosure.
Figure 10:
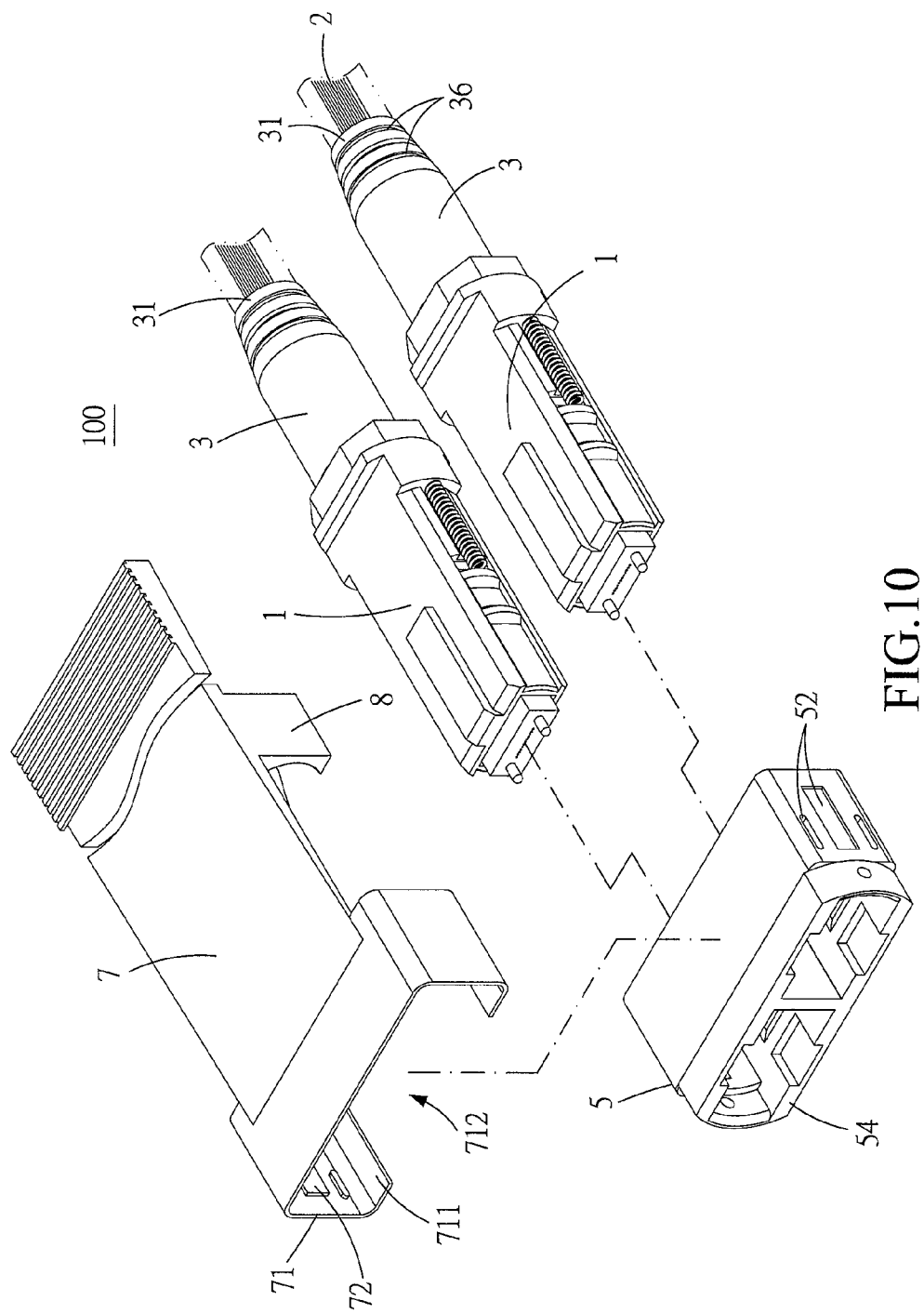
FIG. 10 illustrates an exploded view of the optical fiber connector of the second embodiment.

Please refer to FIGS. 9 and 10, illustrating an optical fiber connector according to a second embodiment of the instant disclosure. FIG. 9 illustrates a perspective view of an optical fiber connector according to a second embodiment of the instant disclosure. FIG. 10 illustrates an exploded view of the optical fiber connector of the second embodiment. In this embodiment, the width of the handle 7 increases and the handle 7 comprises two push blocks 8. The handle 7 is assembled out of two inner shells 1 in a side-by-side arrangement, and the two push blocks 8 are respectively fitted over the two tail caps 3. Furthermore, the outer shell 5 is fitted over the two inner shells 1. The outer shell 5 has a widened structure and has two interior spaces. The handle 7 drives two inner shells 1 to move backwardly, so that the optical fiber connectors 100 can be pulled out. Conversely, when the connectors are to be inserted into the fiber adapters, the two push blocks 8 of the handle 7 push the tail caps 3, so that the connectors can be inserted into the fiber adapters. However, it is understood that, in some embodiments, the handle 7 may be assembled out of three or more inner shells 1 in a side-by-side arrangement, and the handle 7 may have three or more push blocks 8 for pushing a corresponding number of tail caps 3.

Based on the above, according some embodiments of the instant disclosure, since the handle and the outer shell are in a point-contact configuration, when a user pulls the handle, the handle drives the outer shell to move backwardly via the configuration and further compress the spring in the inner shell. Therefore, the connector can be detached from the fiber adapter. Conversely, when the user pushes the handle, the push block on the handle pushes the tail cap due to the mating between the push block and the tail cap, so that the optical fiber connector can be inserted into the fiber adapter. Furthermore, the length of the handle can be adjusted to be longer or shorter by connecting to an elastic arm.

What is claimed is:

1. An optical fiber connector, comprising:
    at least one inner shell, one of two ends thereof having a connection head and the other end thereof extending a tail cap, wherein the tail cap has an abutting surface at an end portion of the tail cap, and an outer diameter of the end portion of the tail cap is gradually reduced toward a free end of the tail cap;
    an outer shell fitted over the at the least one inner shell, wherein the outer shell is formed by two side surfaces and two wall surfaces, the two side surfaces are substantially perpendicular to the two wall surfaces, and the outer shell comprises a plurality of buckling members assembled on the two side surfaces; and
    a handle, two clamping arms respectively extending from two ends of a side portion of the handle, wherein each of the clamping arms is substantially perpendicular to the handle, each of the clamping arms comprises a plurality of buckling portions for buckling with the corresponding buckling member, the handle further comprises a push block fitting over the tail cap, and an inner wall of the push block comprises a mating surface for contacting the abutting surface.

2. The optical fiber connector according to claim 1, wherein the handle comprises a slot formed on a bottom portion of the push block.

3. The optical fiber connector according to claim 2, wherein the abutting surface and the mating surface are cone shaped.

4. The optical fiber connector according to claim 2, wherein the end portion of the tail cap comprises a plurality of skidproof grooves formed on the abutting surface.

5. The optical fiber connector according to claim 1, wherein each of the buckling members is a guiding groove and each of the buckling portions is an engaging block.

6. The optical fiber connector according to claim 5, wherein a longer guiding groove and a shorter guiding groove are respectively formed on each of the side surfaces, and the shorter guiding groove is near one of two sides of the side surfaces.

7. The optical fiber connector according to claim 5, wherein a longer engaging block and a shorter engaging block are respectively formed on an inner wall of each of the clamping arms, and the shorter engaging block is near one of two sides of the inner wall of each of the clamping anus.

8. The optical fiber connector according to claim 1, wherein a mating frame is formed on one side of the outer shell, two curved surfaces are respectively formed on two sides of the mating frame and protruding outwardly.

9. The optical fiber connector according to claim 1, wherein a clamping piece is extending from an end portion of each of the clamping arms, each of the clamping aims and the corresponding clamping piece form an L shaped structure, an opening is formed between the two clamping pieces, each of the clamping pieces is attached on one of the two wall surfaces.

10. The optical fiber connector according to claim 1, wherein two guide pins are protruding from a front portion of the connection head, and a transmission cable is extending from the end portion of the tail cap.

11. An optical fiber connector, comprising:
    a plurality of inner shells, one of two ends of each of the inner shells having a connection head and the other end of each of the inner shells extending a tail cap, wherein the tail cap has an abutting surface at an end portion of the tail cap, and an outer diameter of the end portion of the tail cap is gradually reduced along the tail cap;
    an outer shell fitted over all of the inner shells, wherein the outer shell is formed by two side surfaces and two wall surfaces, the two side surfaces are substantially perpendicular to the two wall surfaces, and the outer shell comprises a plurality of buckling members assembled on the two side surfaces; and
    a handle, two clamping arms respectively extending from two ends of one side of the handle, wherein each of the clamping arms is substantially perpendicular to the handle, each of the clamping arms comprises a plurality of buckling portion for buckling with the corresponding buckling member, the handle further comprises a push block fitting over the tail cap, and an inner wall of the push block comprises a mating surface for contacting the abutting surface.

* * * * *